E. M. WRIGHT & R. W. HALL.
ELECTRIC WATER HEATER.
APPLICATION FILED MAR. 25, 1912.
1,053,550.
Patented Feb. 18, 1913.
2 SHEETS—SHEET 2.
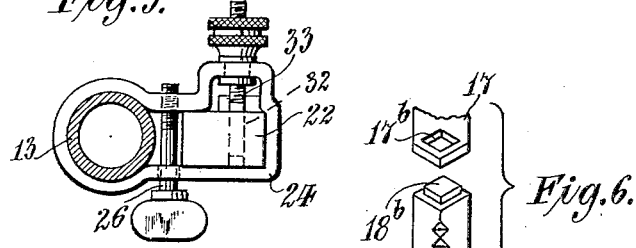
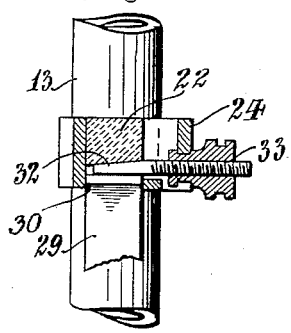
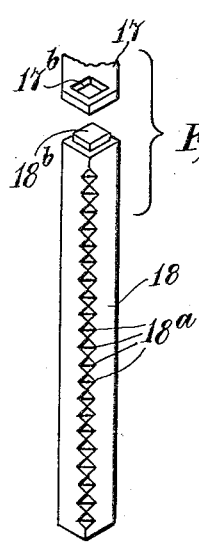
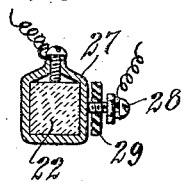
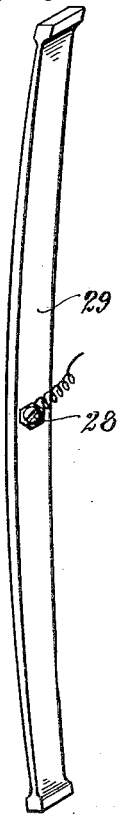
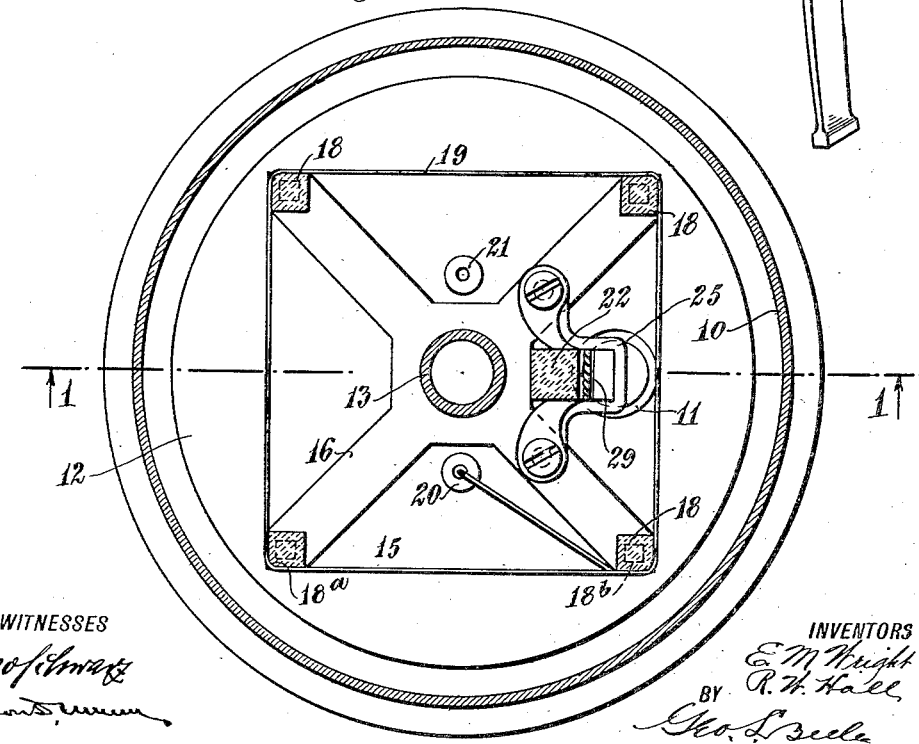

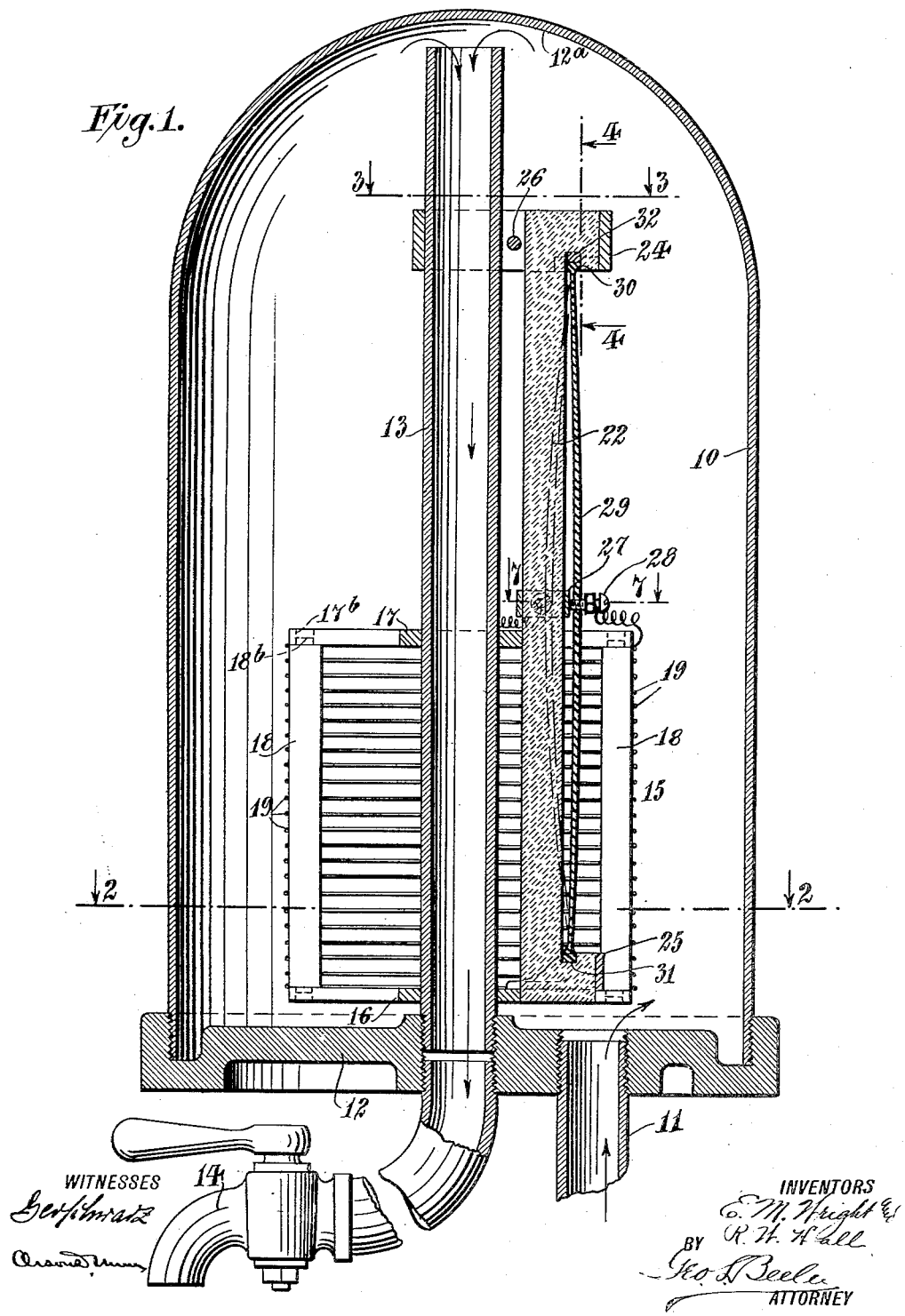

UNITED STATES PATENT OFFICE.

ELMER MORELAND WRIGHT AND ROY WHITFIELD HALL, OF LENTS, OREGON.

ELECTRIC WATER-HEATER.

1,053,550.   Specification of Letters Patent.   Patented Feb. 18, 1913.

Application filed March 25, 1912. Serial No. 686,044.

*To all whom it may concern:*

Be it known that we, ELMER MORELAND WRIGHT and ROY WHITFIELD HALL, both citizens of the United States, and residents of Lents, in the county of Multnomah, State of Oregon, have invented certain new and useful Improvements in Electric Water-Heaters, of which the following is a specification.

This invention relates to that type of devices whereby water or other liquids may be heated to and automatically maintained at any predetermined desired temperature and for any suitable purpose.

For purposes of illustration we have shown our invention as designed for the purpose of heating and dispensing comparatively small quantities of water successively, as in restaurants, cafés, soda water fountains, or the like, all as will be hereinafter fully described and claimed and illustrated in the accompanying drawings, wherein similar parts in the several views are referred to by like reference characters, and in which—

Figure 1 is a substantially central vertical section of a preferred embodiment of the invention on the line 1—1 of Fig. 2; Fig. 2 is a horizontal section on the line 2—2 of Fig. 1; Fig. 3 is a plan view of the discharge pipe and certain parts connected thereto; Fig. 4 is a vertical sectional detail on the line 4—4 of Fig. 1; Fig. 5 is a perspective view of one member of the make-and-break device detached; Fig. 6 is a detail of one of the posts described below and its connection with a spider or frame arm, and Fig. 7 is a transverse sectional detail on the line 7—7 of Fig. 1.

Our device, as illustrated, comprises a casing or container 10 designed to hold at least as much water as may be demanded at any one time for the purpose intended, the same having connection as at the inlet pipe 11 with any convenient reservoir or water supply (not shown). The inlet pipe is arranged preferably so as to empty into the container at the bottom through the base plate 12. The heated water may be withdrawn from the container through the discharge pipe 13, showing as leading from near the top of the container shell 12$^a$ downward through the base plate, to which it is rigidly connected, and the outflow may be controlled by a faucet 14. Except for the inlet and discharge pipes the container will of course be water tight and of sufficient strength to withstand the maximum water pressure of any system into which it may be introduced.

Within the container is a heating device 15 of any suitable construction, shown as comprising a pair of frame members or spiders 16 and 17 rigidly secured in spaced parallel relation to each other, preferably upon the aforesaid discharge pipe 13, and supported by said spiders are a plurality of posts 18, each having at its outermost edge a series of equally spaced notches 18$^a$. A heating wire 19 is led into the container, as through the insulated water-tight plug 20, it being thence coiled as shown around all of said posts 18, the separate coils being held in proper spaced relation by being seated in said notches 18$^a$, and finally the wire emerges from the container through the plug 21. As one convenient means for connecting the spider arms and the posts 18, the latter may be provided with angular end bosses 18$^b$ to be received in correspondingly shaped holes 17$^b$ in the ends of the spider arms.

At any convenient point in the circuit wire 19, preferably adjacent to and in direct line with said inlet pipe 11, is interposed some suitable form of make-and-break device, the same being so designed and arranged as to automatically operate, when the predetermined temperature is reached, so as to cause the movable contact point or member to snap away from the other to a distance greater than the sparking distance. To accomplish this result in the manner now best known to us we provide a rigid member or standard 22 of a material having a low coefficient of expansion and which may be connected for convenience to the discharge pipe 13 as by a clamp 24 at one end and a loop 25 at the other, said clamp being shown connected to the discharge pipe by a set screw 26, and the loop being shown attached to the spider 16. One portion of the wire 19 is connected to a contact point or member 27 secured to the standard 22 intermediate of its ends, and the other part of the conductor is connected to a movable contact point 28 carried by a spring 29 of some material having a high coefficient of expansion. The ends of the spring are seated in sockets 30 and 31 of the upper and lower ends of the standard and are prevented from lateral displacement therefrom by said clamp and loop, respectively. The normal form of the spring is shown in Fig. 5 and as indicated in dotted lines in Fig. 1, whereby its normal tendency is to maintain the points 27 and 28 in contact, completing the circuit and energizing the heater. The arrangement of the standard and contact members is such that when the circuit is closed the spring will be bowed outwardly away from the standard a slight distance beyond the straight line joining the ends of the spring. The extent of lineal expansion of the spring 29 may be determined as by a wedge 32 adjustable laterally with respect to the standard by means of a screw 33.

The operation of our device may be briefly described substantially as follows: The parts being assembled as hereinbefore set forth, on opening the faucet 14 the container will become filled with water, the air being discharged therefrom in the first instance through the discharge pipe 13 and the faucet. As the cool water enters the container the expansion member 29 will contract sufficiently to permit its normal tendency to cause the metal contacts to engage and close the circuit which will remain closed temporarily until the temperature of the water is raised by the heating coil until the desired or predetermined temperature is reached, the spring 29 in the meantime exerting a lineal expansion force against the wedge 32 and the bottom of the socket 31. Such force however being resisted by such parts, the spring will be accordingly compressed until the expansion tendency prevails over its ability to compress, when the elasticity of compression will cause the spring to snap well outward from the contact member 27, which may be regarded as the normal position of the make-and-break device when the container is maintained full of heated water. On each successive opening of the faucet a portion of hot water will be withdrawn permitting cool water to enter through the pipe 11 to keep the container full. If the amount of cool water admitted is sufficient to permit the normal tendency of the spring to throw the contact from its spaced or distorted position into contact with the contact 27 the circuit will again be temporarily completed with the result as aforesaid. The smaller the possibility for lineal expansion of the spring 29, as by adjustment of the wedge to the left in Fig. 4, the lower will be the temperature of the water sufficient to cause the aforesaid outward snapping of contact 28. The adjustment of the wedge may be effected at any time, preferably in the factory or laboratory, or subsequently to installation if desired after removal of a portion of the container shell, the water supply of course being temporarily cut off for such purpose. The normal tendency of the spring to assume the form indicated by dotted lines in Fig. 1, together with the fact that it is almost straight when the circuit is closed, insures that a considerable force of compression will be stored during the tendency of the spring to expand lineally under rise of temperature, and yet the slight outward bowing of the spring will prevent disastrous buckling thereof before the outward snap or break occurs.

Within reasonable limits determined by good judgment of those operating in this art and as a result of extensive experiments the several component parts of our device may be constructed specifically in various ways and of suitable materials, and we do not intend to be limited in the scope of our invention as defined in the claims except as may be required by the state of the art.

Having thus described our invention, what we claim as new and desire to protect by Letters Patent is:

1. In an electric water heater, the combination of a container, inlet and discharge pipes therefor, a heating coil within the container and having substantially fixed relation to the discharge pipe, and an automatic make-and-break device interposed in said heating coil and including a member having a high coefficient of expansion adjacent to and in the direct line of said inlet pipe.

2. In an electric water heater, the combination of means to receive and dispense water, a heating coil connected to said means, and a make-and-break device in direct line with the water receiving means and comprising a member having a high coefficient of expansion whereby it is normally maintained in distorted position with the circuit broken, and means to variably determine the extent of lineal expansion of said make-and-break device member.

3. In an electric water heater, the combination of a container comprising a base and a member separably attached thereto, a discharge pipe rigidly connected to said base and projecting therefrom close to the opposite end of the other container member, means to admit water adjacent said base, a heater coil within the container, a make-and-break device interposed in the heater coil in line with said water inlet and comprising a rigid standard having a flow coefficient of expansion adjacent to and substantially coextensive with the discharge pipe and a long substantially flat spring member having a high coefficient of expansion coöperating with and supported by said standard, said standard and spring carrying the make-and-break contacts, and means to secure the standard to the discharge pipe.

In testimony whereof we have hereunto affixed our signatures in the presence of two subscribing witnesses.

ELMER MORELAND WRIGHT.
ROY WHITFIELD HALL.

Witnesses:
GEO. L. BEELER,
PHILIP D. ROLLHAUS.